H. A. MILLER.
CARBURETER ATTACHMENT.
APPLICATION FILED APR. 18, 1910.

1,014,319.

Patented Jan. 9, 1912.

Witnesses.
Louis W. Gratz.
Lester H. Fulmer.

Inventor
Harry A. Miller.
by Townsend Bour & Huckley
Attys.

UNITED STATES PATENT OFFICE.

HARRY A. MILLER, OF LOS ANGELES, CALIFORNIA.

CARBURETER ATTACHMENT.

1,014,319. Specification of Letters Patent. Patented Jan. 9, 1912.

Application filed April 18, 1910. Serial No. 556,253.

*To all whom it may concern:*

Be it known that I, HARRY A. MILLER, a citizen of the United States, residing at Los Angeles, county of Los Angeles, State of California, have invented a new and useful Carbureter Attachment, of which the following is a specification.

This invention relates to a device which is adapted to be attached to a carbureter to secure economy in fuel.

In starting the engine it is desirable to restrict the air opening so that the mixture will be comparatively rich, and after starting use a less rich mixture which is accomplished by admitting auxiliary air controlled by an air inlet valve.

My invention provides means for regulating the auxiliary air inlet valve means whereby it will be restrained from opening easily and after having been opened, will not receive any reactive pressure tending to close it except its normal closing tendency.

One object of the present invention is to provide a controlling means for the said air valve which will retard its opening by mechanical friction, one advantage of which is that the friction may be easily regulated to adjust the movement of the device.

Another object is to not exert any extra closing power on the valve when it is opened.

It is a simple matter to make the device as a self contained unit of extremely simple construction, which may be attached to the carbureter. A further important advantage is that the device operating by friction, is certain in operation.

Figure 1:
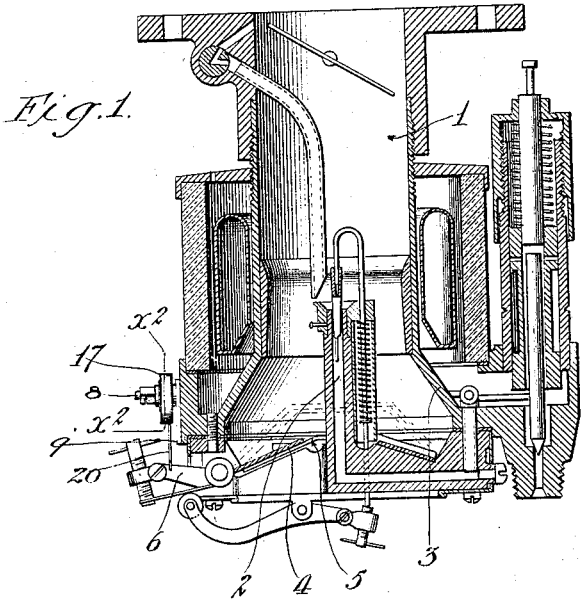
Figure 4:
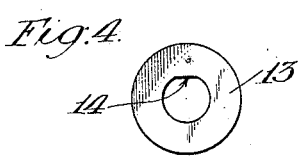
Figure 2:
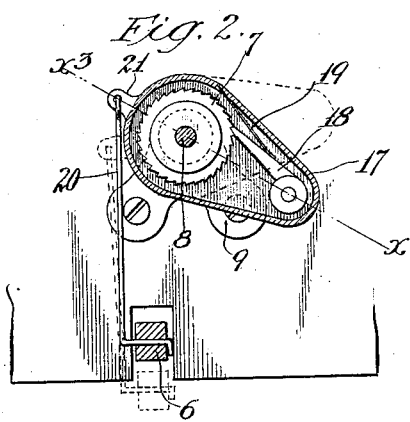
Figure 3:
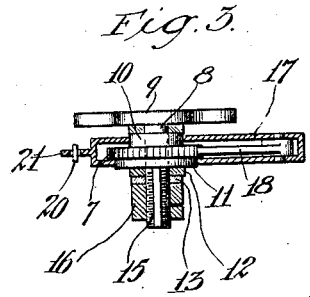
Figure 5:
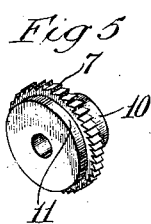

Referring to the drawings: Figure 1 is a vertical longitudinal section through a carbureter equipped with the device. Fig. 2 is an enlarged section on line $x^2$—$x^2$ Fig. 1. Fig. 3 is a section on line $x^3$—$x^3$ Fig. 2. Fig. 4 is an enlarged elevation of a washer. Fig. 5 is a perspective view of the ratchet and friction disks.

1 designates the mixing chamber of the carbureter into which gasolene is admitted from the nozzle 2, air being admitted to the mixing chamber through the conical lower end 3 of the carbureter. The entrance of air to the carbureter is controlled by an air inlet valve which consists of a series of wings 4 pivoted so that they can swing upwardly into the position shown in dotted lines in Fig. 1 when the suction is produced within the mixing chamber. The detailed construction of these wings and other parts of the carbureter proper are clearly shown and described in a previous application of mine, Serial No. 528,400, filed November 16th, 1909. The wings 4 are so constructed that a space 5 is formed around the nozzle 2 when the wings 4 are in their lower position, the space 5 forming what may be called the normal air opening, which permits air to pass into the carbureter when the wings are closed, for use in starting or at very low speeds. One of the wings 4 is provided with an arm 6 which is tilted by the wing whenever the wing moves, the arm being preferably rigidly connected with the wing.

In order to retard the opening movement of the wings, I employ a frictional device which consists of a ratchet wheel 7 which is rotatable on a stationary shaft 8 which is fixed to a plate 9, the latter being secured to the side wall of the carbureter, or any other convenient point of the carbureter. The ratchet 7 is provided with a hub 10 on one side and a hub 11 on the other side. A washer 12 which is free to revolve on the shaft 8 lies against the hub 11. A washer 13, having a straight portion 14 in its bore which engages with a flat face 15 formed on the shaft 8, lies next to the washer 12 and the flat face 15 prevents the washer 13 from turning.

16 is a nut screwed on the shaft 8 which forces the washer 13 against the washer 12, and the latter against the hub 11, and by adjusting the nut 16 friction may be regulated. The washer 13 being non-revoluble, prevents the nut 16 from accidentally unscrewing.

A hollow casing 17 is mounted to rock on the respective hubs 10 and 11, and within the casing 17 is a pawl 18, one end of which is pivoted to the casing 17 and the other end is spring pressed against the ratchet 7 by a flat spring 19. A link 20 at its upper end is connected to a lug 21 on casing 17 and on its lower end is connected to the arm 6 before referred to.

In operation, as the wings 4 are raised by the suction, the arm 6 is depressed, which through the link 20 rocks the casing 17 so that the pawl 18 turns the ratchet 7. The turning movement of the ratchet 7 is resisted by the friction of the washers and this is communicated to the wings 4 and they are thereby retarded in their opening action. The result is, that upon suddenly opening the throttle when running at slow speed, to increase the speed, the wings 4 are not suddenly lifted wide open by the suction from the engine, as they would naturally be, but are retarded by the frictional resistance and caused to move gradually into full open position. The gradual opening of the wings produces a gradually increasing air speed and volume and consequent gradual increase in the amount of oil drawn up from the nozzle. Without this device the carbureter has to be adjusted so that more gasolene will be delivered at a sudden opening of the throttle with the disadvantage that at high speed too much gasolene is delivered. It is important to note that the resistance acting to hold the wings back occurs only during the opening movement of the wings, and does not exist after the wings are opened. Upon reducing the speed, the wings 4 move by gravity toward their closed position, and the arm 6 rises lifting the link 20 and rocking the casing 17 in the opposite direction and retracting the pawl 18 on the ratchet 7, this movement being free and unimpeded by the ratchet so that no friction is offered to the closing movement of the wings 4. Thus the device produces the desired resistance to the opening movement of the wings 4, and yet when the wings have been moved to an open position there is no extra pressure on them tending to return them, as would be the case if a spring or extra weight were employed to retard the opening movement, for if a spring or weight were employed for this purpose, its power would be exerted upon the wings even when the wings were open, tending to close them, thereby reducing the air and enriching the mixture unduly, whereas with my invention, when the wings are open, the ratchet 7 does not exert any reactive force against the wings, tending to close them, and the mixture is not enriched beyond the desired point, thereby securing economy.

What I claim is:

1. A carbureter provided with an air inlet valve and frictional means for restraining only the opening movement of the valve.

2. In a carbureter provided with an air inlet valve, a ratchet, a pawl for operating said ratchet, means coöperating with the air valve for operating said pawl during the opening movement of the air valve, and frictional means for retarding the rotation of the ratchet.

3. In a carbureter provided with an air inlet valve, a shaft on the carbureter, a ratchet journaled on the shaft, a washer in frictional contact with the ratchet for restraining the turning of the ratchet, a nut for adjusting said washer, said washer having a hub projecting on each side thereof, a casing journaled on said hub, a pawl pivoted within said casing and engaging the ratchet, an arm connected with the air inlet valve, and a link from said arm to said casing.

In testimony whereof, I have hereunto set my hand at Los Angeles California this 11th day of April 1910.

HARRY A. MILLER.

In presence of—
G. T. HACKLEY,
FRANK L. A. GRAHAM.